US012597109B2

(12) United States Patent
Mulchandani et al.

(10) Patent No.: US 12,597,109 B2
(45) Date of Patent: Apr. 7, 2026

(54) SYSTEMS AND METHODS FOR GENERATING THREE-DIMENSIONAL MODELS USING CAPTURED VIDEO

(71) Applicant: Schlumberger Technology Corporation, Sugar Land, TX (US)

(72) Inventors: Kishore Mulchandani, Henderson, NV (US); Crispin Chatar, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 174 days.

(21) Appl. No.: 18/470,698

(22) Filed: Sep. 20, 2023

(65) Prior Publication Data

US 2024/0221138 A1     Jul. 4, 2024

Related U.S. Application Data

(60) Provisional application No. 63/477,428, filed on Dec. 28, 2022.

(51) Int. Cl.
| | |
|---|---|
| *G06T 7/00* | (2017.01) |
| *G06T 5/73* | (2024.01) |
| *G06T 7/55* | (2017.01) |
| *G06T 7/73* | (2017.01) |
| *G06T 17/20* | (2006.01) |

(52) U.S. Cl.
CPC .............. *G06T 7/0002* (2013.01); *G06T 5/73* (2024.01); *G06T 7/55* (2017.01); *G06T 7/73* (2017.01); *G06T 17/20* (2013.01); *G06T 2207/10016* (2013.01); *G06T 2207/10028* (2013.01); *G06T 2207/20084* (2013.01); *G06T 2207/30244* (2013.01); *G06T 2210/56* (2013.01)

(58) Field of Classification Search
CPC .................... G06T 17/00; G06T 17/20; G06T 2207/10016; G06T 2207/10028; G06T 2207/20084; G06T 2207/30244; G06T 2210/56; G06T 5/73; G06T 7/0002; G06T 7/55; G06T 7/73
See application file for complete search history.

(56) References Cited

U.S. PATENT DOCUMENTS

| | | | |
|---|---|---|---|
| 2013/0207966 A1 | 8/2013 | Chu | |
| 2019/0066537 A1* | 2/2019 | Van Den Braber | ..... G06T 17/00 |

(Continued)

FOREIGN PATENT DOCUMENTS

| | | |
|---|---|---|
| JP | 2007026036 A | 2/2007 |
| KR | 20170008638 A | 1/2017 |

(Continued)

OTHER PUBLICATIONS

Search Report and Written Opinion of International Patent Application No. PCT/US2023/033222, dated Jan. 8, 2024, 12 Pages.

*Primary Examiner* — Ming Wu
(74) *Attorney, Agent, or Firm* — Kyle R. Miiller

(57) ABSTRACT
Systems and methods of the present disclosure provide acquiring images corresponding to multiple perspectives of a piece of equipment to be modeled. A region of interest in a first image of the images determined to be less blurry than a blur threshold and a brightness of the first image is above a brightness threshold. Based on these threshold relationships a three-dimensional model of the piece of equipment is generated based at least in part on a subset of the images that include the first image.

23 Claims, 6 Drawing Sheets

(56) References Cited

U.S. PATENT DOCUMENTS

| | | | |
|---|---|---|---|
| 2020/0193623 A1* | 6/2020 | Liu | ........................ G06N 3/08 |
| 2022/0084189 A1 | 3/2022 | Kuwabara | |
| 2022/0108129 A1* | 4/2022 | Lin | ........................ G06F 18/40 |
| 2022/0237880 A1 | 7/2022 | Juppe | |
| 2022/0390940 A1* | 12/2022 | Richman | ............. G05D 1/0016 |

FOREIGN PATENT DOCUMENTS

| | | |
|---|---|---|
| KR | 20190105285 A | 9/2019 |
| KR | 20200107194 A | 9/2020 |

* cited by examiner

SYSTEMS AND METHODS FOR GENERATING THREE-DIMENSIONAL MODELS USING CAPTURED VIDEO

CROSS-REFERENCE TO RELATED APPLICATION

This application claims priority to and the benefit of U.S. Provisional Patent Application Ser. No. 63/477,428, entitled "SYSTEMS AND METHODS FOR GENERATING THREE-DIMENSIONAL MODELS USING CAPTURED VIDEO," filed Dec. 28, 2022, which is hereby incorporated by reference in its entirety for all purposes.

FIELD OF THE INVENTION

The present disclosure relates to systems and methods for generating a model of an item using captured video.

BACKGROUND INFORMATION

Three-dimensional models constructed from images of a piece of equipment may be used in a variety of manners in a variety of industries. However, as the usage increases, some deficiencies of different mechanisms for generating the three-dimensional models may become apparent. For example, generation of three-dimensional models relies on high image quality with certain parameters (e.g., blur and/or brightness) that results in a low-quality three-dimensional model when the image quality is lacking. Furthermore, the processing of such images in generating the three-dimensional models may be labor intensive if performed manually but may need various tweaks to generate quality models using an automated process. Thus, various improvements to model generation may be used to produce higher quality three-dimensional models from images.

SUMMARY

A summary of certain embodiments described herein is set forth below. It should be understood that these aspects are presented merely to provide the reader with a brief summary of these certain embodiments and that these aspects are not intended to limit the scope of this disclosure.

Certain embodiments of the present disclosure include acquiring images corresponding to multiple perspectives of a piece of equipment to be modeled. A region of interest in a first image of the images determined to be less blurry than a blur threshold and a brightness of the first image is above a brightness threshold. Based on these threshold relationships a three-dimensional model of the piece of equipment is generated based at least in part on a subset of the images that include the first image.

In addition, certain embodiments of the present disclosure include a memory storing instructions and one or more processors. The one or more processors, when executing the instructions, are configured to acquire multiple images corresponding to multiple perspectives of a piece of equipment to be modeled in three-dimensions. The one or more processors also are configured to acquire depth data from at least one of the perspectives. The one or more processors also are configured to select a subset of the multiple images based at least in part on the depth data. Additionally, the one or more processors are configured to estimate camera positions using the subset of images and to generate depth maps from the depth data. Moreover, the one or more processors also are configured to match features in the subset of images to establish a cloud of points and to build a polygonal mesh from the cloud of points and to build textures on planes of the polygonal mesh to generate a three-dimensional model of the piece of equipment. Furthermore, the one or more processors are configured to evaluate and assign a score to the three-dimensional model.

Furthermore, certain embodiments of the present disclosure include a memory storing instructions and one or more processors. The one or more processors are configured to execute the instructions to obtain multiple images obtained from multiple perspectives of a piece of equipment using one or more cameras. The one or more processors also are configured to determine whether a region of interest in each of the images satisfies a quality threshold for one or more parameters. Additionally, the one or more processors are configured to fix one or more images as fixed images from the images that do not satisfy the quality threshold for the one or more parameters. Moreover, the one or more processors are configured to generate a three-dimensional model of the piece of equipment based at least in part on a subset of the images. The subset of the images includes the images of the plurality of images that initially satisfy the quality threshold and the fixed images. Furthermore, the one or more processors are configured to analyze and assign a quality score to the three-dimensional model based on one or more quality metrics.

BRIEF DESCRIPTION OF THE DRAWINGS

Various aspects of this disclosure may be better understood upon reading the following detailed description and upon reference to the drawings, in which.

DETAILED DESCRIPTION

Figure 1:
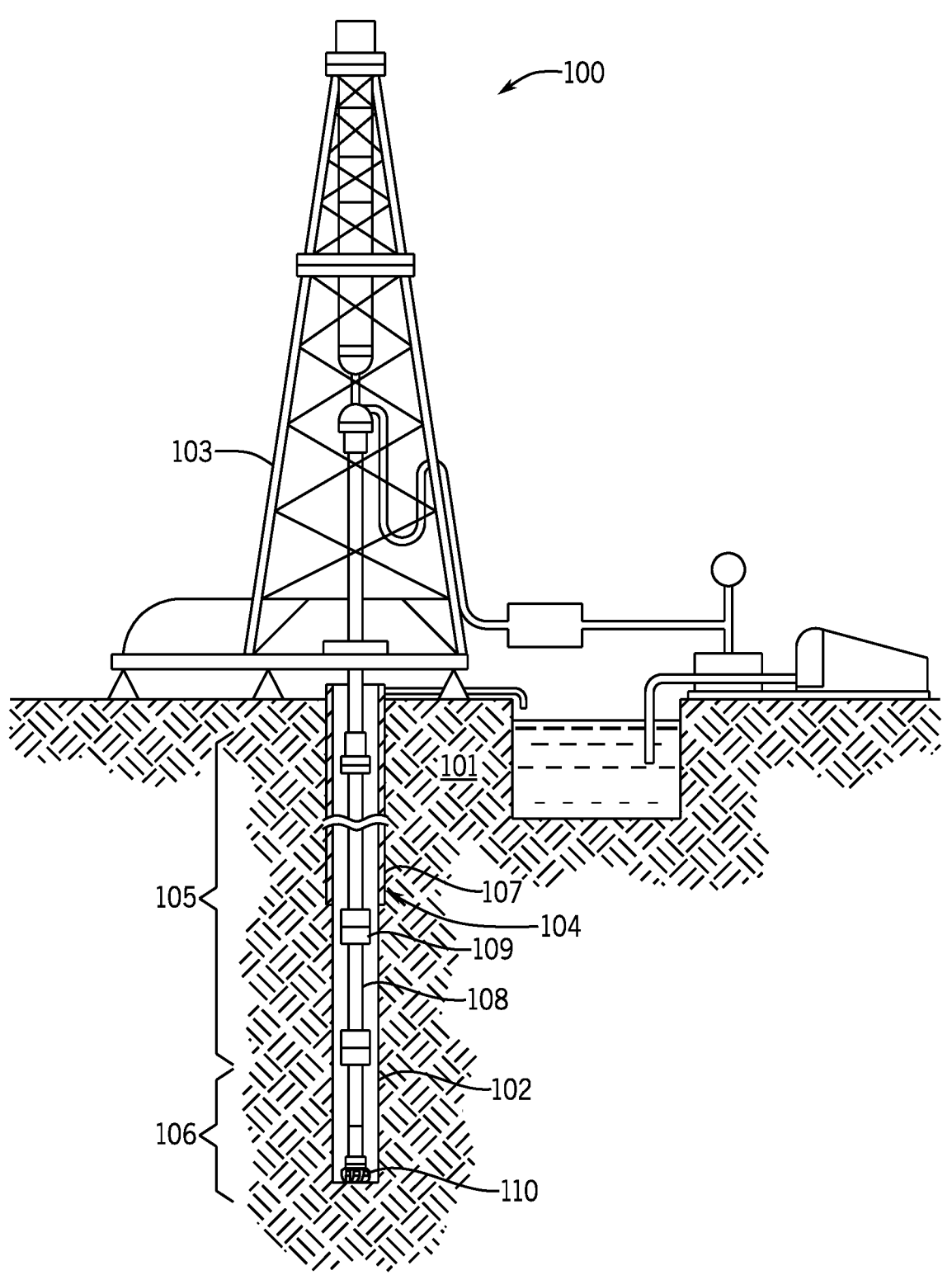
FIG. 1 illustrates a drilling system for drilling an earth formation using a piece of equipment, in accordance with embodiments of the present disclosure.

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

As used herein, the terms "continuous", "continuously", or "continually" are intended to describe operations that are performed without any significant interruption. For example, as used herein, control commands may be transmitted to certain equipment every five minutes, every minute, every 30 seconds, every 15 seconds, every 10 seconds, every 5 seconds, or even more often, such that operating parameters of the equipment may be adjusted without any significant interruption to the closed-loop control of the equipment. In addition, as used herein, the terms "automatic", "automated", "autonomous", and so forth, are intended to describe operations that are performed are caused to be performed, for example, by a computing system (i.e., solely by the computing system, without human intervention). Indeed, it will be appreciated that the control system described herein may be configured to perform any and all of the control functions described herein automatically.

The embodiments described herein include systems, computer-readable media, and methods related to generating a three-dimensional model from images/frames of video. The process may be at least partially automated. As discussed below, the model generation may include determining which images are suitable for image generation. Moreover, at least some images that are below a quality threshold (e.g., blur or brightness) may be addressed by correcting such deficiencies using image correction techniques (e.g., deblurring/sharpening or brightening techniques). Additionally or alternatively, the model generation may rely on depth data that is combined with image data to generate the three-dimensional model. Furthermore, the generated model may be analyzed and scored to indicate a value indicating an overall quality of the generated three-dimensional model.

With the foregoing in mind, FIG. 1 shows one example of a drilling system 100 for drilling an earth formation 101 to form a wellbore 102. The drilling system 100 includes a drill rig 103 used to support and rotate a drilling tool assembly 104 that extends downward into the wellbore 102. The drilling tool assembly 104 may include a drill string 105, a bottomhole assembly ("BHA") 106, and a bit 110, attached to the downhole end of drill string 105.

The drill string 105 may include several joints of drill pipe 108 connected end-to-end through tool joints 109. The drill string 105 transmits drilling fluid through a central bore and transmits rotational power from the drill rig 103 to the BHA 106. In some embodiments, the drill string 105 further includes additional components, such as subs, pup joints, and so forth. The drill pipe 108 provides a hydraulic passage through which drilling fluid is pumped from the surface. The drilling fluid discharges through nozzles, jets, or other orifices in the bit 110 and/or the BHA 106 for the purposes of cooling the bit 110 and cutting structures thereon, and for transporting cuttings out of the wellbore 102.

The BHA 106 may include the bit 110 or other components. An example BHA 106 may include additional or other components (e.g., coupled between to the drill string 105 and the bit 110). Examples of additional BHA components include drill collars, stabilizers, measurement-while-drilling ("MWD") tools, logging-while-drilling ("LWD") tools, downhole motors, underreamers, section mills, hydraulic disconnects, jars, vibration or dampening tools, other components, or combinations of the foregoing. The bit 110 may also include other cutting structures in addition to or other than a drill bit, such as milling or underreaming tools. In general, the drilling system 100 may include other drilling components and accessories, such as make-up/break-out devices (e.g., iron roughnecks or power tongs), valves (e.g., kelly cocks, blowout preventers, and safety valves), other components, or combinations of the foregoing. Additional components included in the drilling system 100 may be considered a part of the drilling tool assembly 104, the drill string 105, or a part of the BHA 106 depending on their locations in the drilling system 100.

The bit 110 in the BHA 106 may be any type of bit suitable for degrading formation or other downhole materials. For instance, the bit 110 may be a drill bit suitable for drilling the earth formation 101. Example types of drill bits used for drilling earth formations are fixed-cutter or drag bits, roller cone bits, and percussion hammer bits. In some embodiments, the bit 110 is an expandable underreamer used to expand a wellbore diameter. In other embodiments, the bit 110 is a mill used for removing metal, composite, elastomer, other downhole materials, or combinations thereof. For instance, the bit 110 may be used with a whipstock to mill into a casing 107 lining the wellbore 102. The bit 110 may also be used to mill away tools, plugs, cement, and other materials within the wellbore 102, or combinations thereof. Swarf or other cuttings formed by use of a mill may be lifted to surface, or may be allowed to fall downhole.

There may be numerous pieces of equipment used in various operations, such as the downhole drilling operation using the drilling system 100. These pieces may have different levels of wear or failure that may be visually analyzed. These pieces may also be sold or moved to other locations where the purchaser or the recipient may want to see the condition of the piece of equipment before purchasing/moving the equipment. Furthermore, a lifespan may be estimated from visual analysis. However, performing such analysis may be difficult in the field with analysis resources (e.g., analysis labs/computing, human experts, etc.) being unavailable in the field. Instead, a three-dimensional model may be used to perform such remote analysis of the pieces of equipment by generating the three-dimensional model from the piece of equipment to be analyzed from captured images/video. Although the following discusses the bit 110 as an example, any other suitable tool/equipment to be analyzed may be used to generate a three-dimensional model similarly. For instance, drill collars, stabilizers, measurement-while-drilling ("MWD") tools, logging-while-drilling ("LWD") tools, downhole motors, underreamers, section mills, hydraulic disconnects, jars, vibration or dampening tools, and/or any other components.

Figure 2:
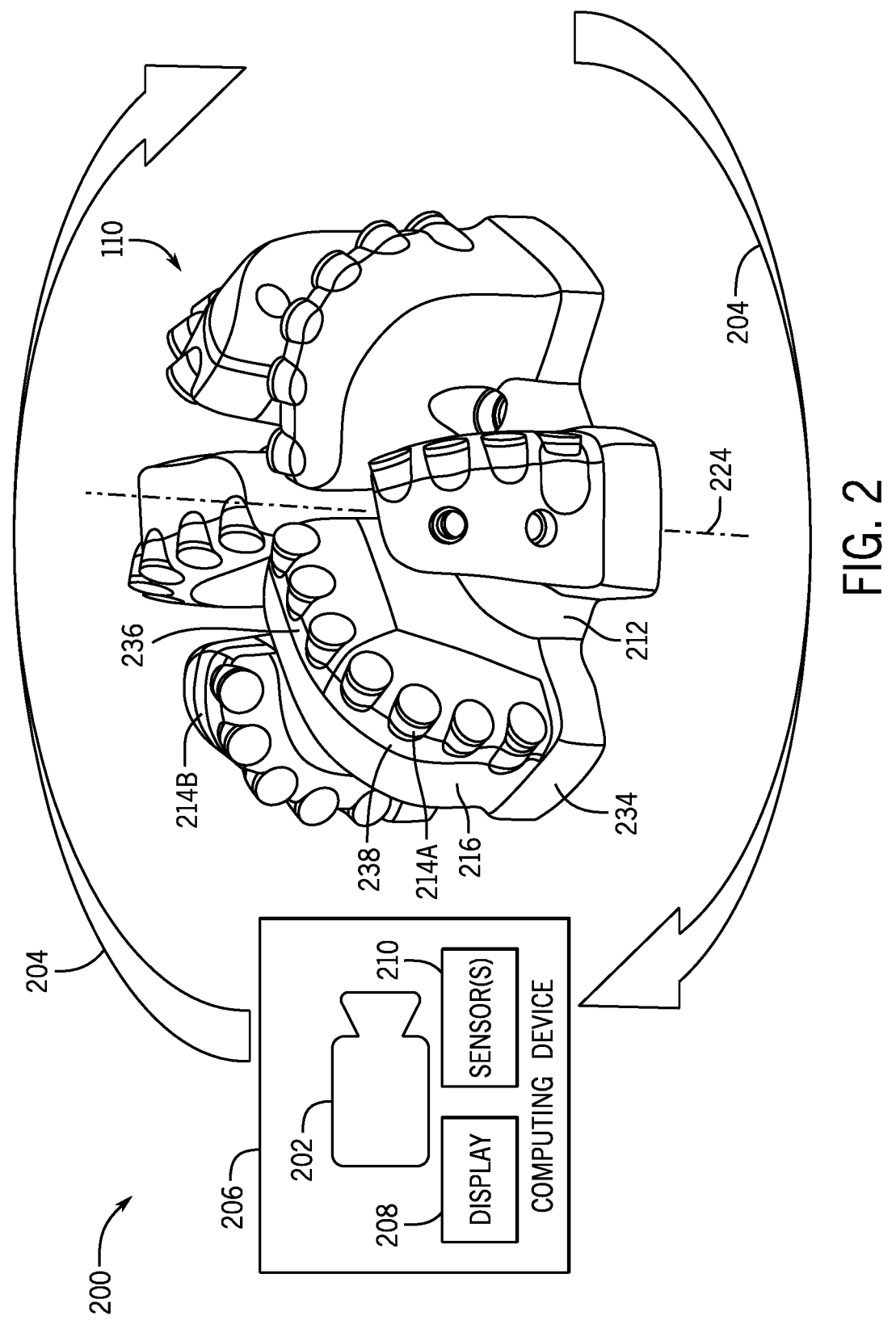
FIG. 2 illustrates an image capturing system used to capture video/images of a piece of equipment, in accordance with embodiments of the present disclosure.

FIG. 2 is a block diagram of an image capturing system 200 used to capture images of a piece of equipment for generation of the three-dimensional model. As illustrated, the piece of equipment may include a crown of the bit 110, but the piece of equipment may alternatively be or additionally include any other piece of equipment to be analyzed, to be sold, etc. The image capturing system 200 includes a camera 202 that may be used to capture different perspectives of the piece of equipment. For example, the camera 202 may be moved around the piece of equipment using a traversal path 204 capturing images and/or video of the piece of equipment. Additionally or alternatively, the camera 202 may remain stationary while the piece of equipment is rotated about one or more axes according to the traversal path 204. The traversal path 204 may include multiple orbits at different paths around the piece of equipment to capture a sufficient image/video coverage of the piece of equipment. Although a single camera 202 is discussed herein to capture multiple images/video using movement of the camera 202, multiple cameras may instead be used with no movement or less movement. The camera 202 may be a digital camera or video equipment dedicated to capturing video or images. Alternatively, the camera 202 may be an image sensor integrated into a computing device 206, such as a cellular phone or tablet computer. In some scenarios, the camera 202 may be integrated with the computing device 206 being a desktop computer, laptop computer, a server, or other computing device. The camera 202 may be connected to the computing device 206 wirelessly (e.g., Bluetooth, Wi-Fi, IEEE 802.15.4, and/or other suitable wireless connections) and/or using wired connections (e.g., USB cable, Ethernet cable, and/or other suitable wired connection). Alternatively, the camera 202 may capture the images/video and store the images/video on a storage medium (e.g., flash drive or memory card) that may later be used to load the images/video into the computing device 206.

Furthermore, in some embodiments, the capture of the video/images may be performed within an application program being executed on the computing device 206 where the camera 202 is integrated with or in communication with the computing device 206 during or before the capture. Upon receipt of a selection of an image capture mode or a three-dimensional model generation mode, the application program may instruct a user via a display how to perform the capture. For instance, the application program may instruct the user using a display 208 that movement is occurring too quickly (e.g., blurring) or slower than necessary. The computing device 206 may make such determinations using the captured image/video data or using one or more sensors 210 (e.g., depth sensors and/or location/orientation sensors) in the camera 202/computing device 206.

Using such techniques, the camera 202 may capture multiple perspectives of the bit 110. For instance, the perspective may show a bit body 212 of the bit that includes multiple blades 214. For instance, the bit body 212 includes one or more primary blades 214A and one or more secondary blades 214B captured in the images/video. In some embodiments, the primary blades 214A and secondary blades 214B both extend to a gage region 234 of the bit 110, and the primary blades 214A extend radially inward to be nearer a longitudinal axis 224 of the bit 110 when compared to the secondary blades 214B that are all captured in the three-dimensional model.

As illustrated, the video/images also capture a bit 110 including the blades 214 formed from a pre-fabricated shell 236 metallurgically bonded thereto. The shell 236 is irreversibly or irremovably bonded to the bit body 212 that may be discernible from the captured video/images. The video/images may show that the shell 236 includes one or more cutter pockets 238. The shell 236 may outline cutter pockets 238 that include a sidewall and optionally a base. The three-dimensional model, using the video/images, may show that a cutting element 216 is positioned in the cutter pocket 238. The three-dimensional model may reproduce the type of cutting elements 216 such as the shear cutting elements shown or other types of cutting elements (e.g., a non-planar cutting element). At least some structure/materials may be captured using alternative means different from the captured video/images. For example, the three-dimensional model may include such structure/materials using input (e.g., depth/distance data, computing device 206 location/orientation/positioning) via the sensor(s) 210 and/or via other models or knowledge bases specifying structure/materials of the piece of equipment to be analyzed/sold/etc. The sensor(s) 210 may include a light detection and ranging (LiDAR) system, a gyroscope, a gravity sensor, and/or any other suitable depth, location, orientation, or positioning sensors.

In some embodiments, some detail may be indiscernible from visual inspection, and such details may be supplemented to be stored in the three-dimensional model. For instance, the three-dimensional model may store an indication that the shell 236 includes or is made of a shell material that is the same or different from material used to form the bit body 212 and/or the blades 214 even when such compositions may not be discernible from visual inspection alone. For example, the shell material may include a ceramic, carbide, diamond, or ultrahard material that is different than a ceramic, carbide (e.g., tungsten carbide, tantalum carbide, titanium carbide, etc.), metal, metal alloy, or other material of the bit body 212 or blades 214. Similarly, the three-dimensional model may indicate whether carbide material of the shell 236 is an infiltrated, sintered, or cemented carbide material.

The three-dimensional model may also store additional details about the wear of the parts of the equipment. For instance, in some embodiments, the material of the bit body 212 and/or of the blades 214 is a material with a lower erosion and/or wear resistance than the material of the shell 236, and the three-dimensional model may carry such information whether the data is input by a user and/or pulled from specifications for the parts being modeled.

Figure 3:
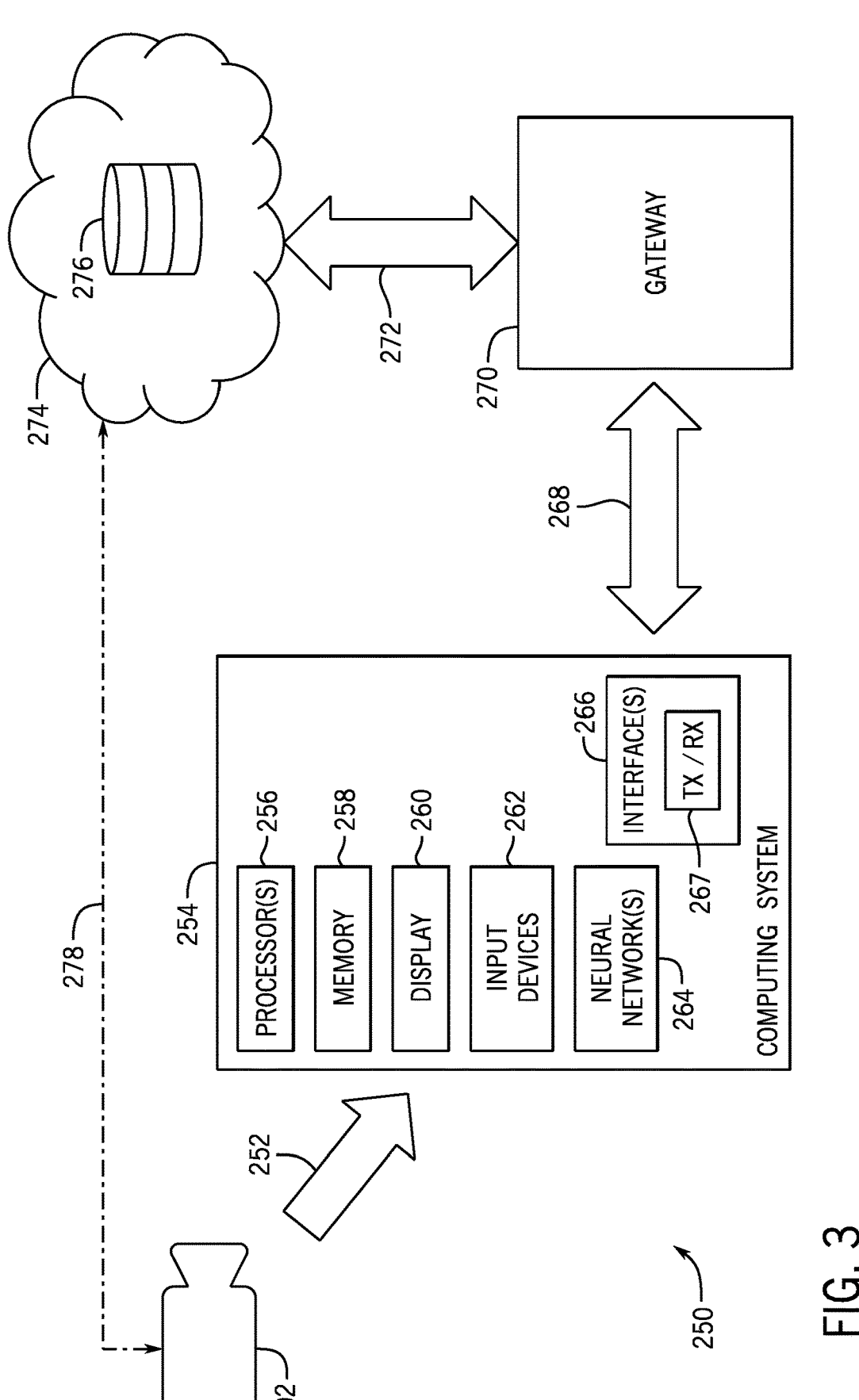
FIG. 3 illustrates a block diagram of a model generation system used to generate a three-dimensional model corresponding to the piece of equipment using the captured video/images of FIG. 2, in accordance with embodiments of the present disclosure.

FIG. 3 is a block diagram of a model generation system 250 that may be used for generating a three-dimensional model from video of the piece of equipment captured using the image capturing system 200. The video is received as input data 252 at a computing system 254 from the camera 202. As a reminder, the camera 202 may be implemented within a computing device 206 that may transmit the input data 252 as wired or wireless communications. The computing device 206 may include all components shown in FIG. 2 and may include any components discussed in relation to the computing system 254. Indeed, in some embodiments, the computing system 254 may be and/or may include the computing device that includes the camera 202. The various functional blocks shown in FIG. 3 may include hardware elements (including circuitry), software elements (including computer code stored on a tangible computer-readable medium), or a combination of both hardware and software elements. It should be noted that FIG. 3 is merely one example of a particular implementation and is intended to illustrate the types of components that may be present in the computing system 254.

As illustrated, the computing system 254 includes one or more processor(s) 256, a memory 258, a display 260, input devices 262, one or more neural networks(s) 264, and one or more interface(s) 266. In the computing system 254, the processor(s) 256 may be operably coupled with the memory 258 to facilitate the use of the processors(s) 256 to implement various stored programs. Such programs or instructions executed by the processor(s) 256 may be stored in any suitable article of manufacture that includes one or more tangible, computer-readable media at least collectively storing the instructions or routines, such as the memory 258. The memory 258 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor(s) 256 to enable the computing system 254 to provide various functionalities.

The input devices 262 of the computing system 254 may enable a user to interact with the computing system 254 (e.g., pressing a button to increase or decrease a volume level). The interface(s) 266 may enable the computing system 254 to interface with various other electronic devices. The interface(s) 266 may include, for example, one or more network interfaces for a personal area network (PAN), such as a Bluetooth network, for a local area network (LAN) or wireless local area network (WLAN), such as an IEEE 802.11x Wi-Fi network or an IEEE 802.15.4 wireless network, and/or for a wide area network (WAN), such as a cellular network. The interface(s) 266 may additionally or alternatively include one or more interfaces for, for example, broadband fixed wireless access networks (WiMAX), mobile broadband Wireless networks (mobile WiMAX), and so forth.

In certain embodiments, to enable the computing system 254 to communicate over the aforementioned wireless networks (e.g., Wi-Fi, WiMAX, mobile WiMAX, 4G, LTE, and so forth), the computing system 254 may include a transceiver (Tx/Rx) 267. The transceiver 267 may include any circuitry that may be useful in both wirelessly receiving and wirelessly transmitting signals (e.g., data signals). The transceiver 267 may include a transmitter, a receiver, or a transmitter and a receiver combined into a single unit.

The input devices 262, in combination with the display 260, may allow a user to control the computing system 254. For example, the input devices 262 may be used to control/initiate operation of the neural network(s) 264. Some input devices 262 may include a keyboard and/or mouse, a microphone that may obtain a user's voice for various voice-related features, and/or a speaker that may enable audio playback. The input devices 262 may also include a headphone input that may provide a connection to external speakers and/or headphones.

The neural network(s) 264 may include hardware and/or software logic that may be arranged in one or more network layers. In some embodiments, the neural network(s) 264 may be used to implement machine learning and may include one or more suitable neural network types. For instance, the neural network(s) 264 may include a perceptron, a feed-forward neural network, a multi-layer perceptron, a convolutional neural network, a long short-term memory (LSTM) network, a sequence-to-sequence model, and/or a modular neural network. In some embodiments, the neural network(s) 264 may include at least one deep learning neural network.

As discussed below, the output of the neural network(s) 264 may be based on the input data 252, such as metrics used to quantify the quality of the generated model. This output may be used by the computing system 254. Additionally or alternatively, the output from the neural network(s) 264 and/or the processor(s) 256 may be transmitted using a communication path 268 from the computing system 254 to a gateway 270. The communication path 268 may use any of the communication techniques previously discussed as available via the interface(s) 266. For instance, the interface(s) 266 may connect to the gateway 270 using wired (e.g., Ethernet) and/or wireless (e.g., IEEE 802.11) connections. The gateway 270 couples the computing system 254 to a wide-area network (WAN) connection 272, such as the Internet. The WAN connection 272 may couple the computing system 254 to a cloud network 274. The cloud network 274 may include one or more computing systems 254 grouped into one or more locations (e.g., data centers). The cloud network 274 includes one or more databases 276 that may be used to store the output of the neural network(s) 264. Indeed, in some embodiments, the camera 202 (or the computing device that the camera 202 is a part of) may send the input data 252 to the cloud 274 via connection 278 (e.g., Wi-Fi, cellular, and/or Internet connections). In such embodiments, the computing system 254 may be implemented in the cloud 274. Additionally or alternatively, at least some of the processing may be performed in the computing device that includes the camera 202. In some embodiments, the cloud network 274 may perform additional transformations on the data using its own processor(s) 256 and/or neural network(s) 264. As such, all of the following steps discussed as performed in the computing system 254 may be performed in a computing system 254 that includes the camera 202 (e.g., computing device 206), a computing system 254 that is separate from but receives image/video from the camera 202, the cloud network 274, and/or any other suitable computing devices.

Figure 4:
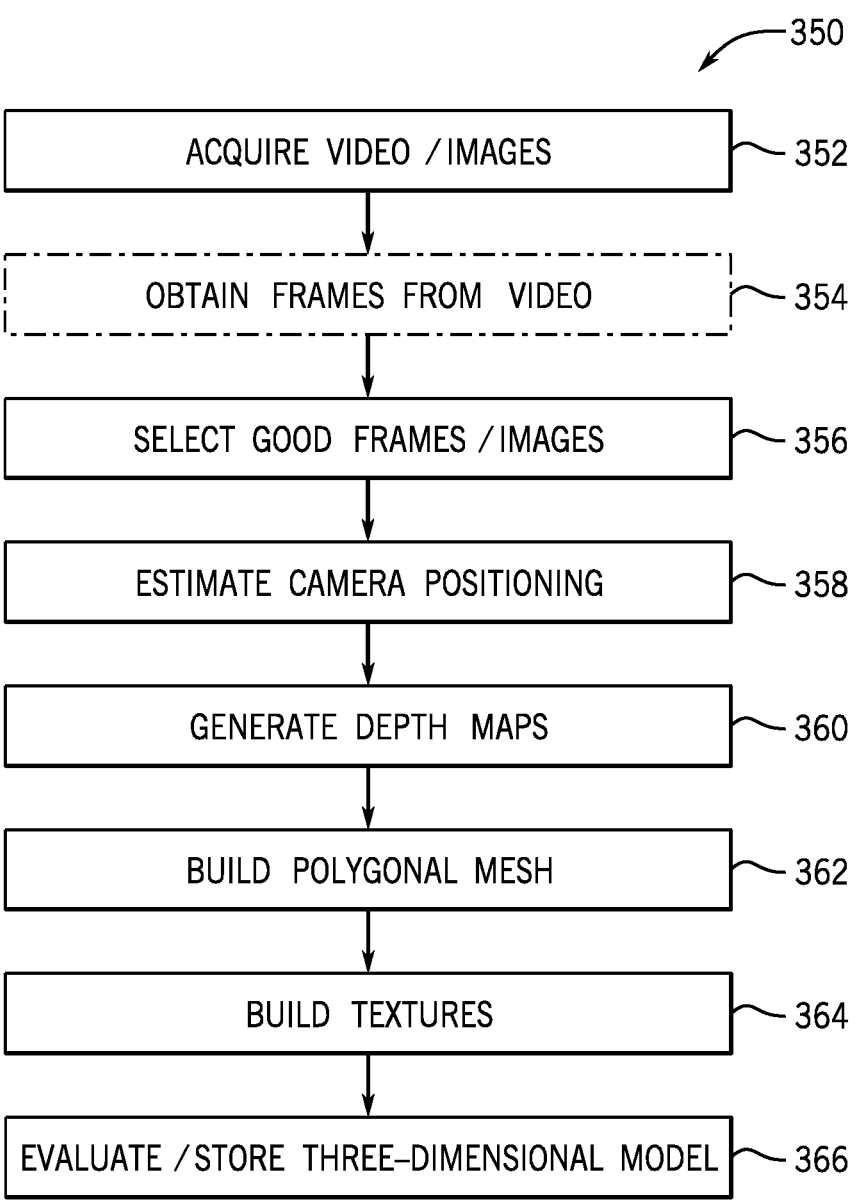
FIG. 4 illustrates a flow diagram of a process used by the model generation system of FIG. 3 to generate the three-dimensional model, in accordance with embodiments of the present disclosure.

FIG. 4 is a flow diagram of a process 350 that may be utilized by the model generation system 250 to generate a model from image/video data. The model generation system 250 acquires video and/or images (block 352). For instance, the camera 202 may capture the images and transmit them wirelessly or wired to the computing system 254 as the captured images in the input data 252. Additionally or alternatively, computing system 254 may obtain the images/video by retrieving them from the cloud 274. If the captured data is video data, the computing system 254 may obtain frames from the video data (block 354). For instance, the computing system 254 may obtain each frame of image data from the video data. Additionally or alternatively, the computing system 254 may obtain a number of frames less than all of the frames. For instance, the computing system 254 may sample a number of frames per time period (e.g., seconds or minutes).

As discussed below in more detail related to FIG. 4, the computing system 254 may select good frames/images from the video/image data (block 356). Specifically different parameters (e.g., brightness, sharpness/blur, etc.) of the captured frames/images may be used to discard frames/images that may be unsuitable for generating a model while preserving those that are good candidates for generating the model.

The three-dimensional model of the piece of equipment may be generated from the video/images using structure from motion photogrammetric range imaging techniques. As part of this generation, the computing system 254 uses these images to estimate camera positioning (block 358). For instance, the computing system 254 may determine features in the images/video by determining features of the piece of equipment using one or more feature detector algorithms. For example, the computing system 254 may use the scale-invariant feature transform (SIFT) to determine features in the images and the respective locations of the camera 202 in relation to the piece of equipment. Thus, the estimate of the camera positions may be made entirely using image data captured by the camera 202. Furthermore, when the image frames are taken from video, there is a natural ordering or sequence of the image frames. Thus, when estimating camera locations of the image frames, false positives may be eliminated. For instance, if the camera location is too far from a previous set based on heuristics or tracked camera movement speed, the false positives may be eliminated. These false positives may be the result of feature matching errors due to a lack of unique features in the object being modeled or highly regular features of the object. For example, a checkerboard pattern being parallel to a camera plane may lead to false positives.

To eliminate false positives in images, a time variable (t) may be added to 2-D pixel positions (e.g., x and y). This time may be acquired from a timestamp of the images. Two features that are closer in time and in 2-D location may be more likely to be the same feature than two features that are far apart in time. Since the difference in time is to be expected based on the time between captures. To group times, rounding may be performed. For instance, all time values may be rounded up to a nearest value (e.g., quarter of a second, eighth of a second, etc.). In some embodiments, the rounding value may be dynamic from image to image, capture session to capture session, or even within a single image.

Additionally or alternatively, at least some of the positioning determination or verification may be based on measurements made in the computing system 254 that includes the camera 202, such as location tracking (e.g., GPS, cell or Wi-Fi) or motion sensors that include gravity sensors, linear acceleration sensors, rotation vector sensors, significant motion sensors, step counter sensors, step detector sensors, accelerometer, magnetometer, gyroscopes, and/or other sensor types. This data may be used to encode metadata/ancillary data along with the video/image data to be used in determining estimated camera locations. Additionally or alternatively, both image data and positioning/motion data may be used to determine estimated camera locations where location estimations that overlap for respective images may be deemed to be confirmed. Additionally or alternatively, both determinations may be weighted so that the relative methodologies for estimation are weighted. For example, if a first methodology and the second methodology estimate locations that are within a threshold (e.g., 1 foot) of each other, the location may be the weighted average of their distance between the points. Thus, a respective weights of 0.6 and 0.4 weight for the first and second methodologies would be 60% of the distance from a first point found using the second methodology and 40% of the distance from a second point found using the first methodology. In some embodiments, these weights may be static. Additionally or alternatively, the weights may be dynamic and related to picture quality and/or noise in the positioning/motion data where higher quality images (e.g., brightness between high and low thresholds, blur above a threshold, resolution, etc.) get a higher weight for image data than lower quality images get. Similarly, if the positioning/motion data is above a noise or jitter threshold, the positioning/motion-based estimation may be weighted lower than when the positioning/motion data is below the noise or jitter threshold.

Using the estimated camera positioning, the computing system 254 generates depth maps (block 360). The depth maps may also be based at least in part on depth data captured by the camera 202 and/or a computing device that includes the camera 202 using a depth sensor (e.g., a LiDAR sensor). This depth data may be sent from the camera 202 to the computing system 254 along with the image data where the image and depth data may be processed, refined, and/or analyzed in different pipelines. Additionally or alternatively, this depth data may be combined with the image data early on or late in the process. For example, a depth channel may be added to the image data. For example, RGB data may be supplemented with a depth (D) channel to create RGBD data.

Using the depth maps and estimated camera positioning, the computing system 254 builds a polygonal mesh of the object to be modeled (block 362). For instance, the computing system 254 may establish a cloud of points corresponding to various locations on the features. In some embodiments, these points may be filtered by various parameters. For example, the points may be filtered by depth from the depth sensor so that estimated feature points outside of a threshold distance from the depth charts with at least some of the points being discarded from the cloud of points. Additionally or alternatively, the camera 202 and/or computing device 206 may have a specified general shape for the piece of equipment to be modeled. The shape may be specific to a selected piece of equipment to be captured following a profile of the device or may be more generic (e.g., an ellipsoid) that generally matches an expected size of the piece of equipment to ignore potential points outside of the generic shape.

Additionally or alternatively, building the polygonal mesh may include building a first cloud of points using image data and a second cloud of points using depth data. The clouds of points may be fused together to form a combined cloud of points. No matter how the cloud of points is determined, once the cloud of points has been established and/or filtered, the computing system 254 may establish the polygonal mesh using polygonal planes (e.g., triangles). Establishing the polygonal mesh includes connecting the points of the cloud of points to establish polygonal planes that approximate the surfaces of the piece of equipment. In some embodiments where the clouds of points were generated separately, building the polygonal mesh may include correcting the image space (e.g., RGB) cloud with the depth-based cloud. The image space clouds may be noisier than the depth-based clouds with the depth-based cloud used to smooth the noise in the image space cloud by using the depth-based cloud of points as attractor points that pulls points in the image-based cloud to the respective points. Additionally or alternatively, the image-based points may be used as attractor points for a depth-based cloud.

Once the polygonal mesh has been established, the computing system 254 builds textures on the model emulating textures of the object to be modeled using texture mapping (block 364). Texture mapping is a method of wrapping a two-dimensional image or texture on a three-dimensional surface of the polygonal mesh. Texture mapping assigns unique two-dimensional coordinates to the points in the cloud of points.

Figure 6:
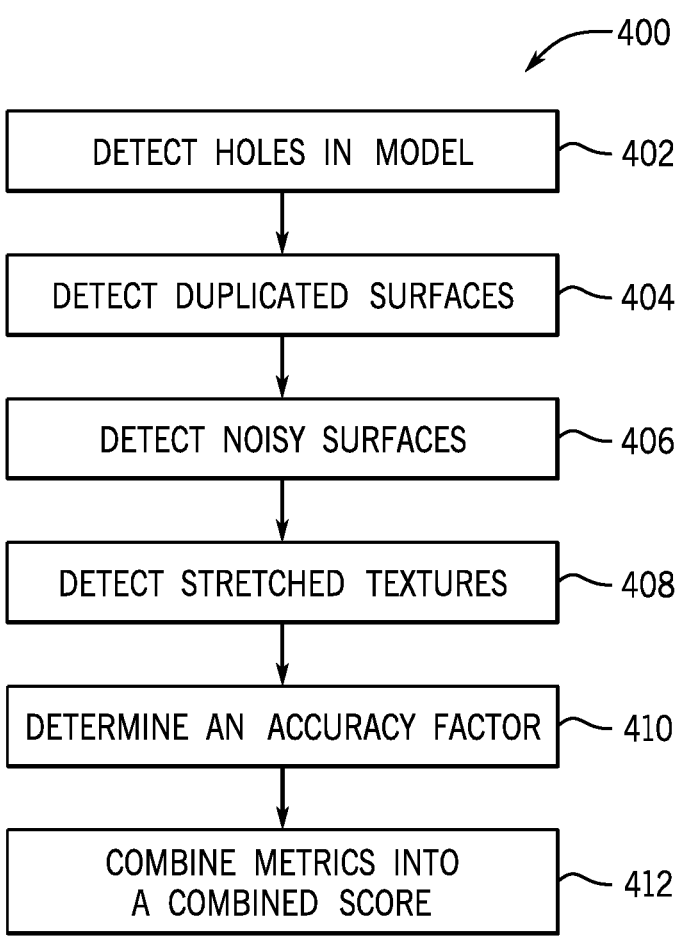
FIG. 6 illustrates a process used by the model generation system of FIG. 4 to evaluate the three-dimensional model, in accordance with embodiments of the present disclosure.

As discussed below in more detail related to FIG. 6, the computing system 254 evaluates and/or stores the three-dimensional model (block 366). If the three-dimensional model is evaluated to be satisfactory, the three-dimensional model may be stored. Alternatively, if the three-dimensional model is deemed unsatisfactory, the computing system 254 may reattempt construction from the video/images with point tweaking. The reattempted construction may uses the same images or a may use a different subset of the acquired images. Alternatively, the computing system 254 may request that new video/images be acquired to try again.

Figure 5:
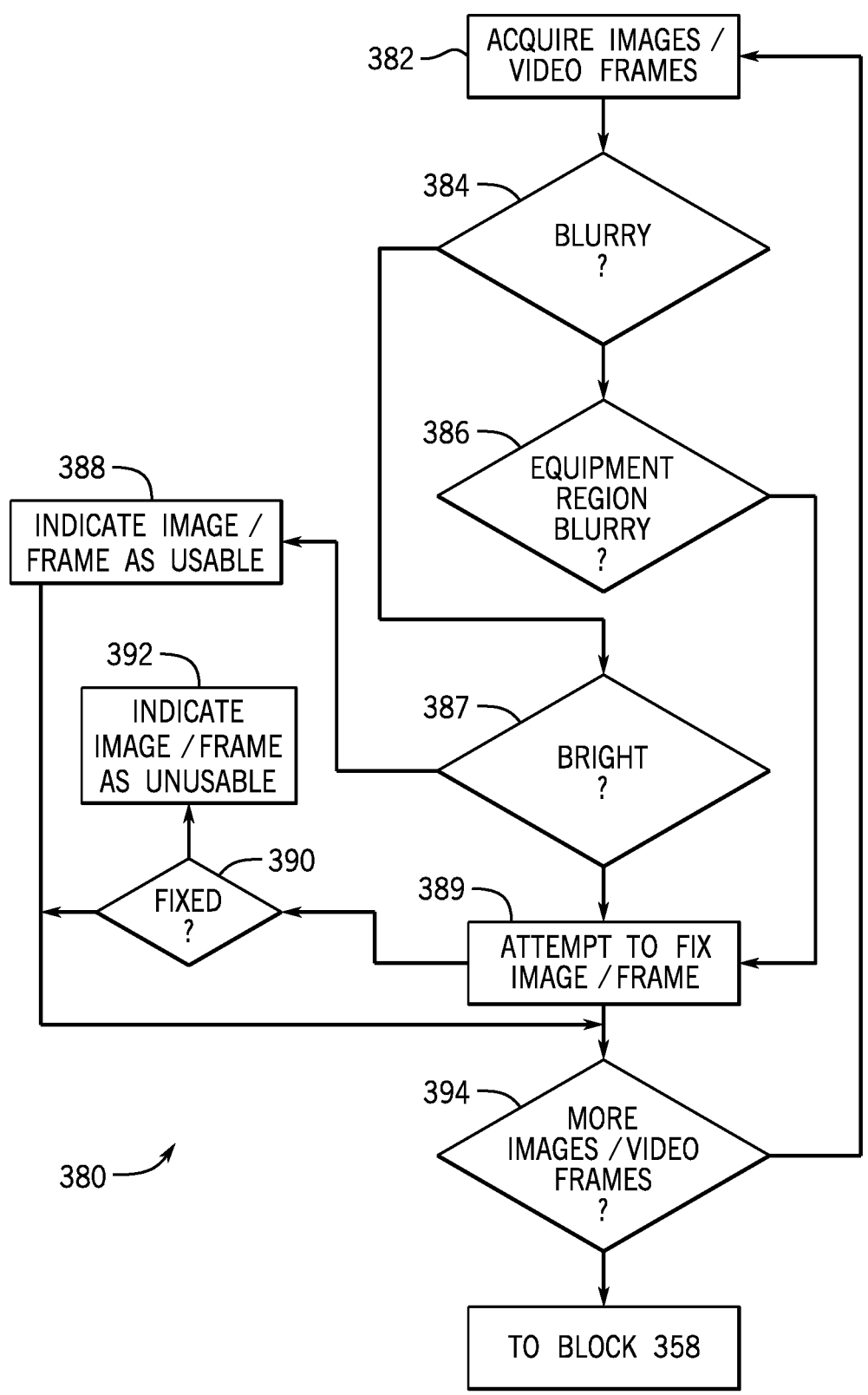
FIG. 5 illustrates a process used by the model generation system of FIG. 3 to select good frames/images from the video/images of FIG. 2, in accordance with embodiments of the present disclosure.

FIG. 5 is a flow chart of a process 380 that may be used by the computing system 254 to select good frames/images as indicated in block 356 of FIG. 4. Using inferior quality images for reconstruction can negatively impact the resulting three-dimensional model. The negative impact due to picking a high number of lower quality images may be worse than the negative impact of using fewer images of higher quality. Thus, the computing system 254 may try to remedy or remove inferior quality images as part of the process 380. In the process 380, the computing system 254 may acquire images/video frames (block 382) similar to the actions discussed in relation to block 352 of FIG. 4. The computing system 254 may determine whether the image/frame is blurry (block 384). For instance, a blurriness metric may be applied to determine a blurriness factor for the entire image/frame. This blurriness may be related to poor focus or improper motion/speed of motion. Sharply focused images may be more suitable for generating the three-dimensional model that blurry images. However, images that have a blurry background with a sharp focus of the piece of equipment may still be satisfactory for model generation. In fact, images that are blurrier in only background regions may even be more suitable than images with sharply focused background regions since the three-dimensional model has fewer irrelevant points resulting from image processing keeping only the most relevant points. Accordingly, the computing system 254 may determine whether a region corresponding to an expected location or size of the piece of equipment is blurry (block 386). For instance, as previously discussed, the capture of images may be associated with an expected shape of a selected type of equipment. The shape may be specific to a selected piece of equipment to be captured following a profile of the device or may be more generic (e.g., an ellipsoid) that generally matches an expected size of the piece of equipment to ignore potential points outside of the generic shape. In some embodiments, this shape may be presented by the camera 202 during capture indicating where to position the camera 202 relative to the piece of equipment and any portions of the image outside of a guide may be ignored in blurry evaluations. Additionally or alternatively, depth data may be used to weight (e.g., multiply by a factor of less than 1 such as 0) blurriness where the depth data indicates a longer distance likely indicative of a background. Additionally or alternatively, locations near the middle of the image may be weighted more heavily than portions near the edge that are more likely to be background regions.

If the equipment region is not blurry beyond some threshold, the computing system 254 may determine whether the image (or just the equipment region) is bright enough (block 387). For instance, the image data in the equipment region designated using one of the previously discussed mechanisms for determining the equipment region may be evaluated for whether the brightness is above a threshold. If the brightness and blurriness is satisfactory, the computing system 254 may indicate that the image/frame is usable in generating the three-dimensional model (block 388). If the brightness and/or the blurriness is unsatisfactory, the computing system 254 may attempt to fix the image/frame (block 389). For instance, the computing system 254 may apply deblur/sharpening algorithms to the image data if the blurry threshold is surpassed and increase brightness and/or contrast in the image. In some embodiments, only certain portions may be fixed. For instance, only expected relevant portions may be deblurred/sharpened while suspected background regions may be left alone. Additionally or alternatively, dark portions (e.g., shadows) may be brightened while other portions above a threshold may be left unchanged. Deblurring operations may be aided using information from the image acquisition. For instance, the speed of movement of a capture device (e.g., the camera 202) may be used to perform a measured deblurring. For instance, the faster the capture device is moving, the slower the shutter speed, the lower the frame rate of the camera 202, the nearer the object being modeled is, or other parameters may increase the blurring of the object in the captured images. These parameters may be used to perform the measured deblurring of frames to perform an appropriate level of deblurring.

The computing system 254 may then reanalyze the modified image to determine whether the image has been fixed (block 390). If the image is still not satisfactory (i.e., crosses a threshold for at least one deficient parameter), the computing system 254 may indicate that the image/frame is unusable (block 392). In other words, the computing system 254 may indicate that the image/frame is not a good image/frame in the process 350 of FIG. 4. In some embodiments, the computing system 254 may delete the image/frame. If the image/frame was satisfactory with or without fixing, the computing system 254 may flag the image/frame as usable (block 388) in the rest of the three-dimensional model generation in in the process 350 of FIG. 4.

The computing system 254 determines whether there are more images/video frames to analyze (block 394). For example, no more images are to be analyzed when all images/video frames that have been received have been analyzed, when a target number of images/frames has been analyzed, or any other mechanism. If no more images are to be analyzed, the computing system 254 continues on to block 358 of FIG. 4. If there are more images/frames to analyze, the computing system 254 restarts the process 380 for the next image.

Although the illustrated process 380 includes analyzing blur in two parts, in some embodiments, only the relevant portions may be evaluated for blur in a single step. Additionally or alternatively, in some embodiments, only a single parameter (e.g., blur or brightness) may be used to determine whether the image is satisfactory. Furthermore, additional or different parameters (e.g., resolution) may be used to determine whether the images are good and satisfactory for three-dimensional model generation. Furthermore, in certain embodiments, such parameter analysis may be performed by training one or more of the neural network(s) 264. Moreover, in certain embodiments, the computing system 254 may forego attempting to fix low-quality images and may analyze and use the images in the condition that they are received.

Being able to quantify the quality of the constructed three-dimensional model may be a key element of being able to evolve the quality of reconstruction, or to determine which images are good or not good to be used for reconstruction. The artifacts in the three-dimensional models may include holes in the model, duplicated surfaces, noisy surfaces, and/or stretched textures on the models. Thus, the computing system 254 may perform analysis on the constructed three-dimensional model. FIG. 6 shows a process 400 that includes multiple indicators that are combined to generate an overall metric. Although multiple metrics are shown in the process combined into a single metric, in some embodiments, at least some of the metrics may be omitted and/or some metrics may be added. For instance, a single metric may be used in some embodiments. Additionally or alternatively, different metrics may be used for different situations. For instance, more metrics may be used for analyzing a constructed model for a first piece of equipment while fewer metrics may be used for analyzing a constructed model for a second piece of equipment. The process 400 may be implemented using the same computing system 254 used to construct the three-dimensional model and/or using a different computing system 254.

The process 400 includes detecting holes in the model (block 402). For instance, the computing system 254 may render the three-dimensional model against an improbable color for the three-dimensional model (e.g., saturated red (#FF0000), saturated green (#00FF00), etc.). If this color is visible through the model in any direction that should be a solid block, there is a hole in the model. A hole metric (H) may be determined as the size of the hole may be counted by the number of pixels or surface area when the model is scaled to real word units. The processor(s) 256 and/or the neural network(s) 264 may be used to analyze any holes and their corresponding sizes.

The process 400 also includes detecting duplicated surfaces (block 404). Duplicated surfaces may come from camera position and orientation being miscalculated by the model generation or when the object itself moves while photos/video are made. This movement may be difficult to detect when the shift is gradual. The detection of and metric for duplicated surfaces may use a trained neural network(s) 264 by using a ratio (D=Boxd/Boxfull) between the bounding box (Boxd) of the duplicated area to the full three-dimensional bounding box (Boxfull) of the model to indicate how severe the duplication is. Additionally or alternatively, distances may be calculated from points to other points that are not connected in the topology or are connected to such points with long paths (e.g., above a first threshold) while being geometrically close (e.g., within a second threshold) to such points. This duplication may be quantified by measuring the ratio of a number of triangles that are duplicates to the total triangle count for the three-dimensional model. This duplication ratio "D" would be zero in the ideal case and represented as D=Triangles duplicated/Triangles in model.

The process 400 also includes detecting noisy surfaces (block 406). Noise in a surface includes bumps and/or dents on a surface that are not in the original surface captured in the image. To measure the noise introduced by model construction rather than the original surface may rely on the unique characteristics of construction-induced noise. These unique characteristics may be trained into the neural network(s) 264 using empirical data. Using this training data, the neural network(s) 264 may be used to identify the parts of the model that have undesirable noise. If the part being reconstructed is a known geometric shape, one may use that known geometric shape as a frame of comparison. The noise level "N" may be calculated as the area of the surface with construction noise divided by a total surface area to obtain a quantification of noise. Additionally or alternatively, N may be quantified using a logarithmic scale similar to how acoustic noise decibels are measured.

The process also includes detecting stretched textures (block 408). Texture stretching appears in regions that have inadequate coverage and the only angles that cameras have captured the surface are at sharply acute angles. In such situations, the construction may attempt to fill gaps with the colors from neighboring pixels. Thus, to detect stretched textures, pixels may be compared with other pixels around them. For instance, the neural network(s) 264 may include a trained convolutional neural network (CNN) that recognizes and labels such stretched regions. Once the stretched regions are recognized, the stretched texture artifacts may be quantified by taking a ratio of the area of the stretched regions to the area of the unstretched regions. That ratio (Is) may be made on a per image basis. An overall stretching metric (S) may be determined by summing all the Is over all the images of the model taken from multiple angles and dividing by the number of images used in generation of the model. This score (S) is the final metric. As previously noted, the number of images can vary depending on the type of object being modeled. For instance, an adequate number may be chosen at predefined viewing angles. For instance, a piece of equipment (e.g., drill bit) be views taken every 5 to 10 degrees on a turntable.

The process 400 may also include determining an accuracy factor (block 410). Absence of artifacts by itself may not be sufficient to judge the quality of model. The accuracy of the model in representing the original object may also be an important criterion. An accuracy metric (A) may be based on renderings of the model from the same viewpoints as the viewpoints of the real photographs. After eliminating background pixels from the rendering, the computing system 254 may compare the remaining pixels to those in the photograph. The comparisons may be based in grayscale and/or color versions of these pixels in the model and images. The ratio of the matched pixels to total pixels being analyzed may be determined for each camera perspective. The average of these ratios over all the viewpoints may be the accuracy metric (A).

The metrics may be combined into a combined score (block 412). For instance, an equation: M=(ka*A)/(1.0+ (kh*H+kd*D+kn*N+ks*S)) may be used where ka, kd, kn, and ks may be constants used to weight the respective accuracy metric (A), holes metric (H), duplication metric (D), noise metric (N), and the stretching metric (S), and M is the combined metric. The constants ka, kh, kd, kn, and ks may be found heuristically based on the type of application and relative importance of these for the application. For example, an application that is to 3D print the model would rely more heavily on the noise metric (N) than the stretching metric (S) and may use a first value (e.g., 0) for ks and a second value (e.g., 1) for kn. On the other hand, an application for constructing the model for rendering in a video game may rely less on N as much as polygon counts may be relatively low compared with other uses of the model. Although a specific formula is presented, alternative algorithms may be used to combine the metrics. In the forgoing equation, when any constant is made 0, the corresponding metric is ignored without causing a divide-by-zero problem. The larger the denominator, the smaller the M metric that indicates lower quality. If all constants are zero except ka, M becomes ka*A. Alternative evaluations may be 1 when all constants are zero. In some embodiments, when the combined metric is below a threshold, the computing system 254 may discard the model, attempt to reconstruct the model from the original images, and/or ask for new images/video to start over in the model construction.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

What is claimed is:

1. A method, comprising:
   acquiring images via a camera in electrical communication with a processor, the images corresponding to a plurality of perspectives of a piece of equipment;
   determining, using the processor, that a region of interest in a first image of the images is less blurry than a blur threshold;
   determining, using the processor, that a brightness of the first image is above a brightness threshold;
   estimating, using the processor, a position of the camera based on the images;
   obtaining depth data for the piece of the equipment based on the position;
   generating, using the processor, a three-dimensional model of the piece of the equipment based on a subset of the images, wherein the subset of the images comprises the first image; and
   assigning a score to the three-dimensional model based on at least one of:
      holes present in the three-dimensional model in place of solid structures; or
      stretched textures present in the three-dimensional model.

2. The method of claim 1, wherein the images comprise frames of video.

3. The method of claim 1, wherein the region of interest comprises a whole of the first image.

4. The method of claim 1, wherein a size and a location of the region of interest in the first image is based on an expected shape of the piece of the equipment.

5. The method of claim 1, wherein a size and a location of the region of interest in the first image is based on the depth data.

6. The method of claim 1, wherein:
   the brightness is a first brightness; and
   the method further comprises:
      determining that an additional region of interest in a second image of the images is more blurry than the blur threshold, or determining that a second brightness of the second image is below the brightness threshold; and
      attempting to fix the second image to increase a sharpness of the second image or increase the brightness of the second image using image processing.

7. The method of claim 6, comprising:
   determining that the additional region of interest in the second image of the images is less blurry than the blur threshold and that the brightness of the second image is above the brightness threshold after the image processing; and
   including the second image in the subset of the images.

8. The method of claim 6, comprising:
   determining that the additional region of interest in the second image of the images is more blurry than the blur threshold or that the brightness of the second image is below the brightness threshold; and
   excluding the second image from the subset of the images.

9. The method of claim 6, wherein the image processing comprises deblurring of the second image.

10. The method of claim 9, wherein the deblurring of the second image is based on a movement speed of an image capture device used to capture the plurality of perspectives, a shutter speed of the image capture device, a frame rate of the image capture device, a distance of the image capture device and the piece of the equipment during capture of the plurality of perspectives, or a combination thereof.

11. The method of claim 6, wherein the image processing comprises brightening shadows in the second image.

12. The method of claim 1, wherein the acquiring the images comprises acquiring color images and the estimating of the position of the camera is based on the color images.

13. The method of claim 1, further comprising evaluating an accuracy metric for the three-dimensional model based on a pixel-to-pixel analysis in the three-dimensional model and in the subset of the images.

14. A system, comprising:
   a memory storing instructions; and
   one or more processors, that when execute the instructions, are configured to:
      acquire a plurality of images corresponding to a plurality of perspectives of a piece of equipment to be modeled in three-dimensions;
      acquire depth data from at least one of the plurality of perspectives;
      select a subset of the plurality of images based at least in part on the depth data;
      estimate positions of a camera using the subset of the plurality of images;
      generate depth maps from the depth data;
      match features in the subset of the plurality of images to establish a cloud of points and to build a polygonal mesh from the cloud of points;

build textures on planes of the polygonal mesh to generate a three-dimensional model of the piece of equipment;

determine, using the one or more processors, that a region of interest in a first image of the plurality of images is less blurry than a blur threshold;

determine, using the one or more processors, that a brightness of the first image is above a brightness threshold;

estimate, using the one or more processors, a position of the camera based on the plurality of images; and evaluate and assign a score to the three-dimensional model based on at least one of:

holes present in the three-dimensional model in place of solid structures; or stretched textures present in the three-dimensional model.

15. The system of claim 14, wherein the instructions are configured to cause the one or more processors to verify the cloud of points using an expected shape for the piece of equipment to be modeled.

16. The system of claim 14, wherein the instructions are configured to cause the one or more processors to verify the cloud of points using the depth data.

17. The system of claim 14, wherein the instructions are configured to cause the one or more processors to store the three-dimensional model if the score is above a threshold.

18. The system of claim 16, wherein the instructions are configured to cause the one or more processors to reconstruct a new three-dimensional model from the plurality of images and the depth data, ask for new images, reconstruct the new three-dimensional model from a different subset of the plurality of images and the depth data, or discard the three-dimensional model if the score is below the threshold.

19. The system of claim 14, wherein the evaluating and the assigning the score to the three-dimensional model is based at least in part on a presence of duplicated surfaces in the three-dimensional model and a presence of noisy surfaces in the three-dimensional model.

20. The system of claim 19, wherein at least some of the evaluating and assigning the score comprises using one or more neural networks trained for analyzing quality of the three-dimensional model.

21. The system of claim 14, wherein estimating the positions of the camera using the subset of the plurality of images is based at least in part on the features in the subset of the plurality of images and comprises discarding one or more potential camera locations based on times of respective image captures of the plurality of images, movement of an image acquisition system, heuristics, or a combination thereof.

22. A system, comprising:

a memory storing instructions; and one or more processors, that when execute the instructions, are configured to:

obtain a plurality of images obtained from a plurality of perspectives of a piece of equipment using one or more cameras;

determine whether a region of interest in each of the plurality of images satisfies a quality threshold for one or more parameters, including:

determine, using the one or more processors, that a region of interest in a first image of the images is less blurry than a blur threshold; and determine, using the one or more processors, that a brightness of the first image is above a brightness threshold;

fix one or more images as fixed images from the plurality of images that do not satisfy the quality threshold for the one or more parameters;

estimate, using the one or more processors, a position of the one or more cameras based on the images;

obtain depth data for the piece of the equipment based on the position;

generate a three-dimensional model of the piece of equipment based at least in part on a subset of the plurality of images, wherein the subset of the plurality of images comprises the images of the plurality of images that initially satisfy the quality threshold and the fixed images; and analyze and assign a quality score to the three-dimensional model based on at least one of:

holes present in the three-dimensional model in place of solid structures; or stretched textures present in the three-dimensional model.

23. The system of claim 22, wherein the fixing the one or more images comprises sharpening the regions of interest in the one or more images or brightening shadows in the regions of interest in the one or more images.

* * * * *